(12) United States Patent
Theriault

(10) Patent No.: US 9,291,809 B2
(45) Date of Patent: Mar. 22, 2016

(54) SCANNING TELESCOPE

(71) Applicant: RAYTHEON COMPANY, Waltham, MA (US)

(72) Inventor: Philip C. Theriault, Tucson, AZ (US)

(73) Assignee: RAYTHEON COMPANY, Waltham, MA (US)

(*) Notice: Subject to any disclaimer, the term of this patent is extended or adjusted under 35 U.S.C. 154(b) by 102 days.

(21) Appl. No.: 14/136,033

(22) Filed: Dec. 20, 2013

(65) Prior Publication Data
US 2015/0177507 A1 Jun. 25, 2015

(51) Int. Cl.
*G01J 5/02* (2006.01)
*G02B 23/02* (2006.01)
*G02B 17/08* (2006.01)
*G02B 5/10* (2006.01)
*F41G 7/22* (2006.01)

(52) U.S. Cl.
CPC .............. *G02B 23/02* (2013.01); *F41G 7/2253* (2013.01); *F41G 7/2293* (2013.01); *G02B 5/10* (2013.01); *G02B 17/0836* (2013.01)

(58) Field of Classification Search
CPC .......................................................... G01J 5/02
See application file for complete search history.

(56) References Cited

U.S. PATENT DOCUMENTS

| | | | | |
|---|---|---|---|---|
| 4,087,061 A | * | 5/1978 | Burt | 244/3.16 |
| 2009/0303456 A1 | * | 12/2009 | Paiva et al. | 356/3 |
| 2011/0176205 A1 | * | 7/2011 | Shaw et al. | 359/365 |
| 2011/0226955 A1 | * | 9/2011 | Luty et al. | 250/353 |

FOREIGN PATENT DOCUMENTS

| | | | | | |
|---|---|---|---|---|---|
| CN | 103207452 | * | 7/2013 | | G01B 27/00 |
| CN | 103207452 A | * | 7/2013 | | G02B 27/00 |

OTHER PUBLICATIONS

Machine translation of CN 103207452.*

* cited by examiner

*Primary Examiner* — David Porta
*Assistant Examiner* — Hugh H Maupin
(74) *Attorney, Agent, or Firm* — Lando & Anastasi, LLP

(57) ABSTRACT

A scanning telescope including an on-axis four-mirror reflective telescope configured to receive electromagnetic radiation through an optical aperture and to direct and focus the electromagnetic radiation onto an imaging detector, the on-axis four-mirror reflective telescope including a rear-most mirror configured to be movable over a range of angular tilt relative to an optical axis of the scanning telescope to scan a field of view of the imaging detector over a scan range. In one example, the rear-most scanning mirror is the tertiary mirror of the four-mirror reflective telescope, and all four mirrors are axisymmetric about the optical axis of the telescope.

17 Claims, 6 Drawing Sheets

SCANNING TELESCOPE

BACKGROUND

Optical imaging systems typically comprise a detector, usually placed within a housing having an aperture through which the detector may view an external scene, and a telescope that images the external scene onto the detector. Certain optical imaging applications require the ability to scan the field of view of the optical system over a wider field of regard. Existing systems for such application include off-axis telescope designs with flat, fast steering mirrors for scanning. For many applications, the optical subsystem must be as compact as possible, while remaining consistent with required optical performance for high quality imaging. For example, some missile systems require an optical system capable of scanning over small angles with high performance in the infrared spectral bands. Since the diffraction limited imaging resolution is limited by the aperture size, many applications of such missile systems require the aperture to use a very large fraction of the frontal cross-section of the missile in order to achieve good imaging resolution. Therefore, off-axis optical system designs, or on-axis designs that are optically folded using a flat mirror, are not good solutions for such applications.

SUMMARY OF INVENTION

Aspects and embodiments are directed to an on-axis, four mirror scanning telescope with one of the mirrors being the scanning element. In particular, according to one embodiment, the scanning telescope is configured to optimally use the shape and volume available in a missile, and achieves scanning by motion of the rear-most mirror, as discussed in more detail below.

According to one embodiment, a scanning telescope comprises a primary mirror configured to receive electromagnetic radiation via a system aperture and to reflect the electromagnetic radiation, a secondary mirror optically coupled to the primary mirror and configured to receive and further reflect the electromagnetic radiation reflected from the primary mirror, a tertiary mirror optically coupled to the secondary mirror and configured to receive and further reflect the electromagnetic radiation reflected from the secondary mirror, the tertiary mirror further configured to be movable over a range of angular tilt relative to an optical axis of the scanning telescope to scan a field of view of the scanning telescope over a scan range, and a quaternary mirror optically coupled to the tertiary mirror and configured to receive the electromagnetic radiation reflected from the tertiary mirror and to reflect and focus the electromagnetic radiation onto a focal plane of the scanning telescope, wherein the primary, secondary, tertiary, and quaternary mirrors are axisymmetric about the optical axis.

In one example, the primary mirror includes a primary-mirror central opening through which the electromagnetic radiation reflected from the secondary mirror passes. In another example, the quaternary mirror includes a quaternary-mirror central opening through which the electromagnetic radiation reflected from the secondary mirror passes. The primary, secondary, tertiary, and quaternary mirrors may be fabricated from any of single crystal silicon, silicon carbide, Beryllium or aluminum, for example. The electromagnetic radiation may include infrared radiation. In one example the shape and size of the primary, secondary, tertiary, and quaternary mirrors are selected to configure the scanning telescope for installation in a missile.

According to another embodiment, a method of optical imaging in a missile-mounted optical system comprises receiving electromagnetic radiation through an optical aperture positioned proximate a nose of the missile, directing and focusing the electromagnetic radiation onto an imaging detector with an on-axis four-mirror reflective telescope, and scanning a field of view of the imaging detector over an angular scan range by tilting a rear-most mirror of the four-mirror reflective telescope about an optical axis of the four-mirror reflective telescope.

In one example of the method, directing and focusing the electromagnetic radiation includes reflecting the electromagnetic radiation received through the optical aperture with a primary mirror, reflecting the electromagnetic radiation reflected by the primary mirror with a secondary mirror, reflecting the electromagnetic radiation reflected by the secondary mirror with a tertiary mirror, the tertiary mirror being the rear-most mirror, and reflecting and directing to the imaging detector the electromagnetic radiation reflected by the tertiary mirror with a quaternary mirror. In one example, reflecting the electromagnetic radiation from the secondary mirror includes directing the electromagnetic radiation though a primary-mirror central opening in the primary mirror and through a quaternary-mirror central opening in the quaternary mirror to the tertiary mirror. In another example, receiving the electromagnetic radiation includes receiving infrared radiation.

According to another embodiment, a scanning telescope imaging system configured to be mounted in a missile comprises an imaging detector, and an on-axis four-mirror reflective telescope configured to receive electromagnetic radiation through an optical aperture positioned proximate a nose of the missile, and to direct and focus the electromagnetic radiation onto the imaging detector, the on-axis four-mirror reflective telescope including a rear-most mirror configured to be movable over a range of angular tilt relative to an optical axis of the scanning telescope to scan a field of view of the imaging detector over a scan range.

In one example, the on-axis four-mirror reflective telescope includes a primary mirror configured to receive the electromagnetic radiation via the optical aperture and to reflect the electromagnetic radiation, a secondary mirror optically coupled to the primary mirror and configured to receive and further reflect the electromagnetic radiation reflected from the primary mirror, a tertiary mirror optically coupled to the secondary mirror and configured to receive and further reflect the electromagnetic radiation reflected from the secondary mirror, the tertiary mirror being the rear-most mirror and configured to scan the field of view of the imaging detector over the scan range, and a quaternary mirror optically coupled to the tertiary mirror and configured to receive the electromagnetic radiation reflected from the tertiary mirror and to reflect and focus the electromagnetic radiation onto a focal plane of the scanning telescope, wherein the primary, secondary, tertiary, and quaternary mirrors are axisymmetric about the optical axis. In one example, the primary mirror includes a primary-mirror central opening through which the electromagnetic radiation reflected from the secondary mirror passes, and the quaternary mirror includes a quaternary-mirror central opening through which the electromagnetic radiation reflected from the secondary mirror passes. The primary, secondary, tertiary, and quaternary mirrors may be fabricated from any of single crystal silicon, silicon carbide, Beryllium, or aluminum, for example. The electromagnetic radiation may include infrared radiation.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

A missile has aerodynamic requirements that dictate a small frontal cross-section. This small cross-section limits the optical aperture available for light collection. Applications such as missile defense require as large an aperture as possible to collect as much light as possible and to improve the diffraction limited performance. Some prior scanning telescope systems for missile-based applications have used off-axis designs, which typically do not maximize the available aperture size, and additionally have used a gimbaled system to achieve scanning. As a result, the scan rate is relatively low since a large mass (the telescope and detector assembly) must be moved; however, these systems may achieve a relatively large field of regard. Aspects and embodiments are directed to a scanning telescope in which a low-mass moving element is used for scanning, thereby allowing high speed scan motion to be achieved. Additionally, certain aspects and embodiments may be optimal for missile-based systems, providing a configuration that maximizes use of the fraction of missile cross-section that is available for the telescope aperture and thereby achieving significant linear resolution and detection range advantages.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
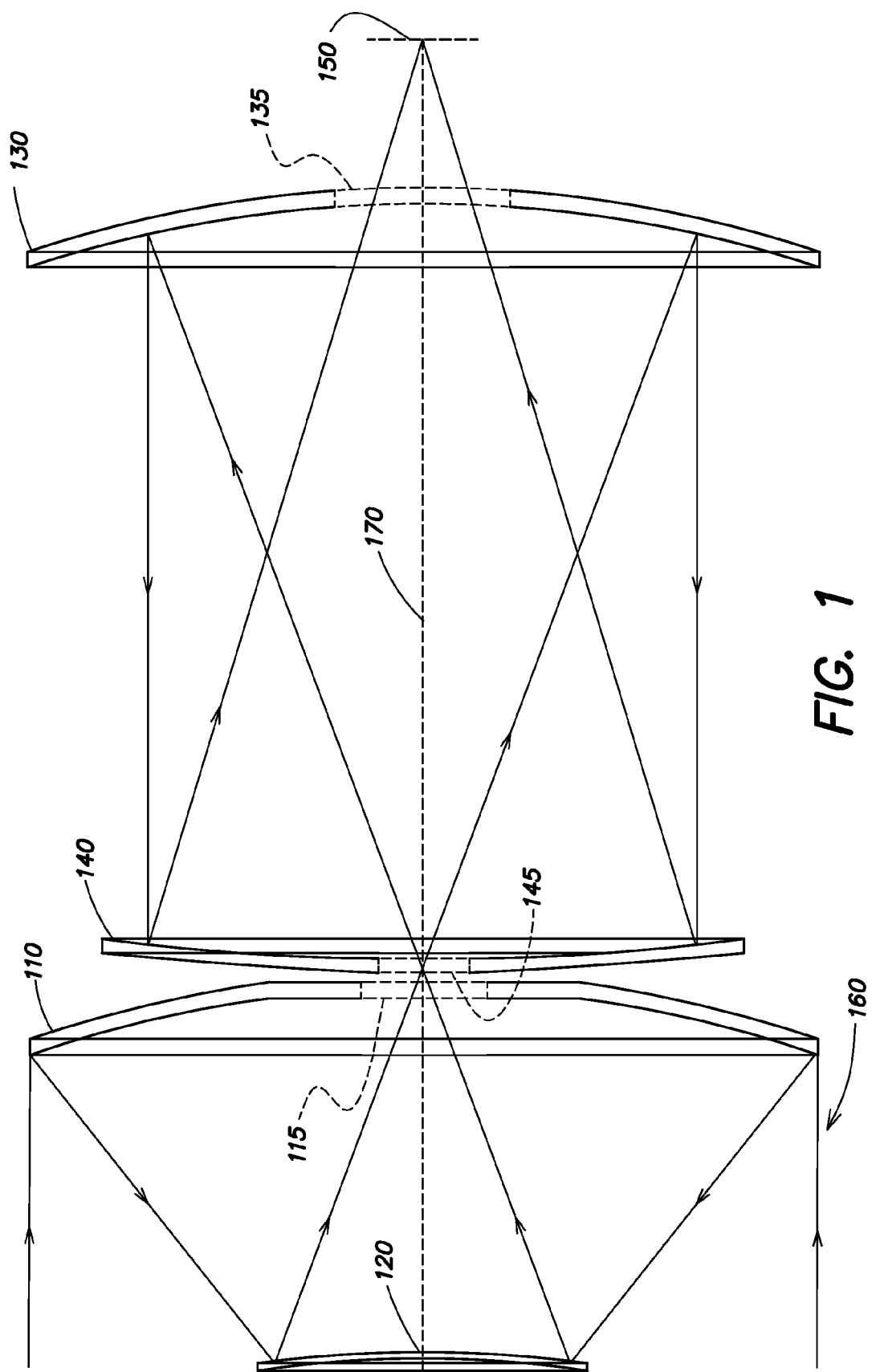
FIG. 1 is a diagram showing a schematic optical layout of one example of a scanning telescope according to aspects of the invention.

Referring to FIG. 1, there is illustrated a schematic diagram of one example of the optics for a scanning telescope according to one embodiment. The scanning telescope includes a primary mirror 110, a secondary mirror 120, a tertiary mirror 130, and a quaternary mirror 140. The telescope may be arranged in a housing (not shown) designed to be accommodated in the nose of a missile. The primary mirror 110 receives electromagnetic radiation 160 from an external scene, and the radiation is directed via the secondary, tertiary, and quaternary mirrors 120, 130, 140 to an image plane 150. An imaging detector may be located at the image plane 150. The primary mirror 110 may be made as large as can be accommodated by the housing, in order to maximize the collection aperture of the scanning telescope.

According to one embodiment, scanning is achieved by moving the tertiary mirror 130. Specifically, the tertiary mirror 130 may be tilted slightly about the optical axis 170 of the telescope over a range of angular tilts, to scan the field of view of the system over a small scanning range. In one example, the telescope images a distant field that has a radius of approximately 0.55 degrees. By tilting the tertiary mirror 130, this 1.1 degree diameter field may be scanned off center to move about 1.75 degrees. Thus, in this example, if the telescope is held fixed, the field of view may be scanned to progressively view a total field 2.3 degrees in radius (or 4.6 degrees in diameter). The total scanned field (for one position of the telescope) achieved by tilting the tertiary mirror 130 is slightly less than the sum of the field diameter and scan range due to different image limits with field at different scan angles. As discussed above, in many applications, a large scan range is not required; however, fast scanning over a small range of angles with high performance imaging may be desirable. Since only the tertiary mirror 130 need be moved to achieve the scan, in contrast to other systems in which the entire telescope and detector assembly are gimbaled, a fast scan rate may be achieved with precise pointing accuracy and excellent optical imaging performance.

The four mirrors 110, 120, 130, and 140 of the scanning telescope may be made from any of several suitable materials, which may be selected based on factors such as, but not limited to, cost and/or weight of the material, and the operational wavelength range(s) of interest. Some examples of materials that may be used to fabricate the mirrors 110, 120, 130, and 140 include Aluminum (Al), Beryllium (Be), Silicon Carbide (SiC), and single crystal Silicon (SCSi). Aluminum may be selected for applications in which cost is a significant factor. Silicon or Silicon Carbide may be preferable for systems in which there are thermal challenges. Beryllium may be selected for applications in which weight is a significant factor, and may be preferable in some examples since the tertiary mirror 130 is moved for scanning, and therefore as light as possible a mirror may be desirable. Generally, all four mirrors 110, 120, 130, and 140 are fabricated from the same material in any given system; however, in certain systems different materials may be used for the various mirrors.

Figure 2A:
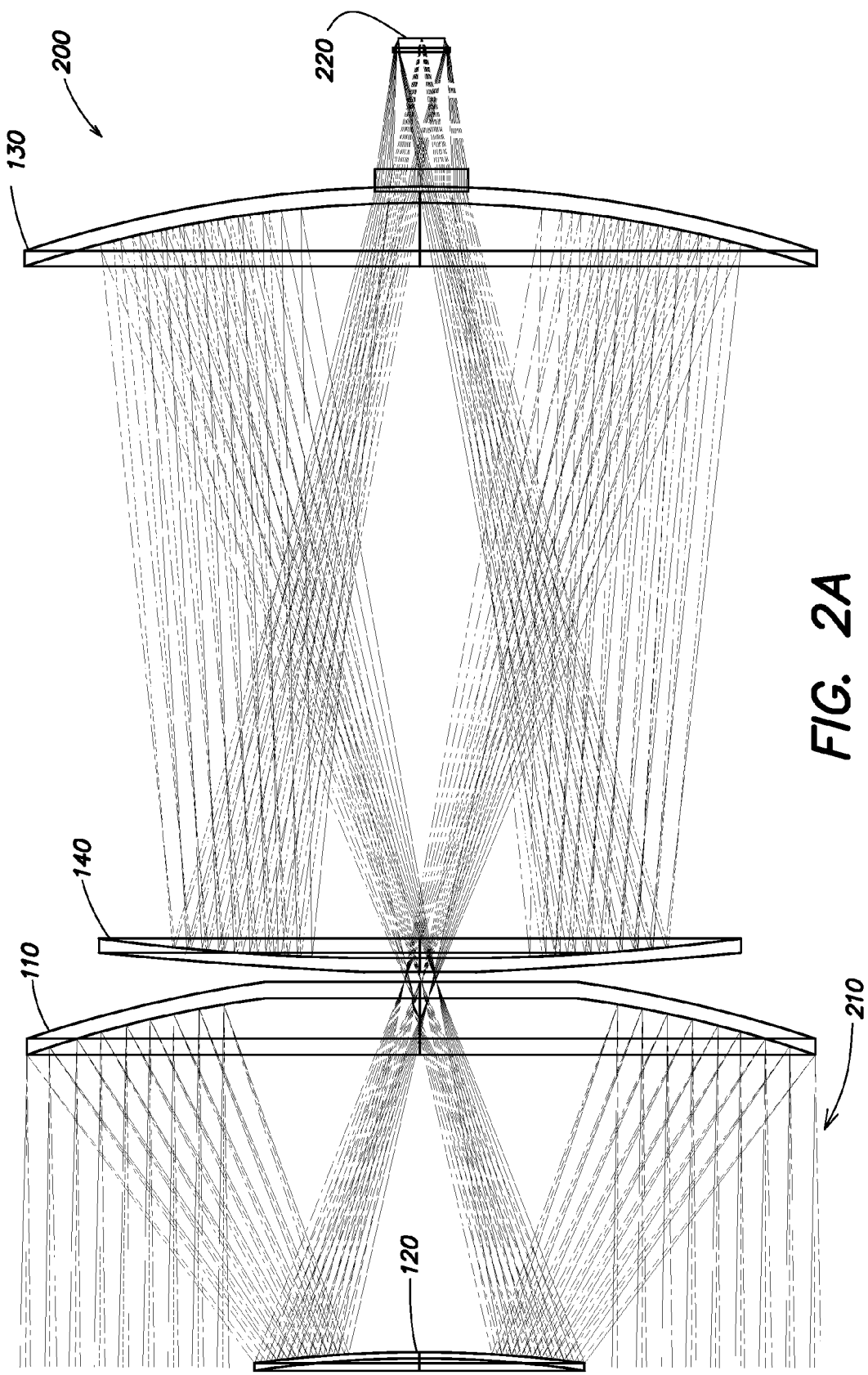
FIG. 2A is a ray trace of one example of the scanning telescope shown at the center scan position, according to aspects of the invention.
Figure 2B:
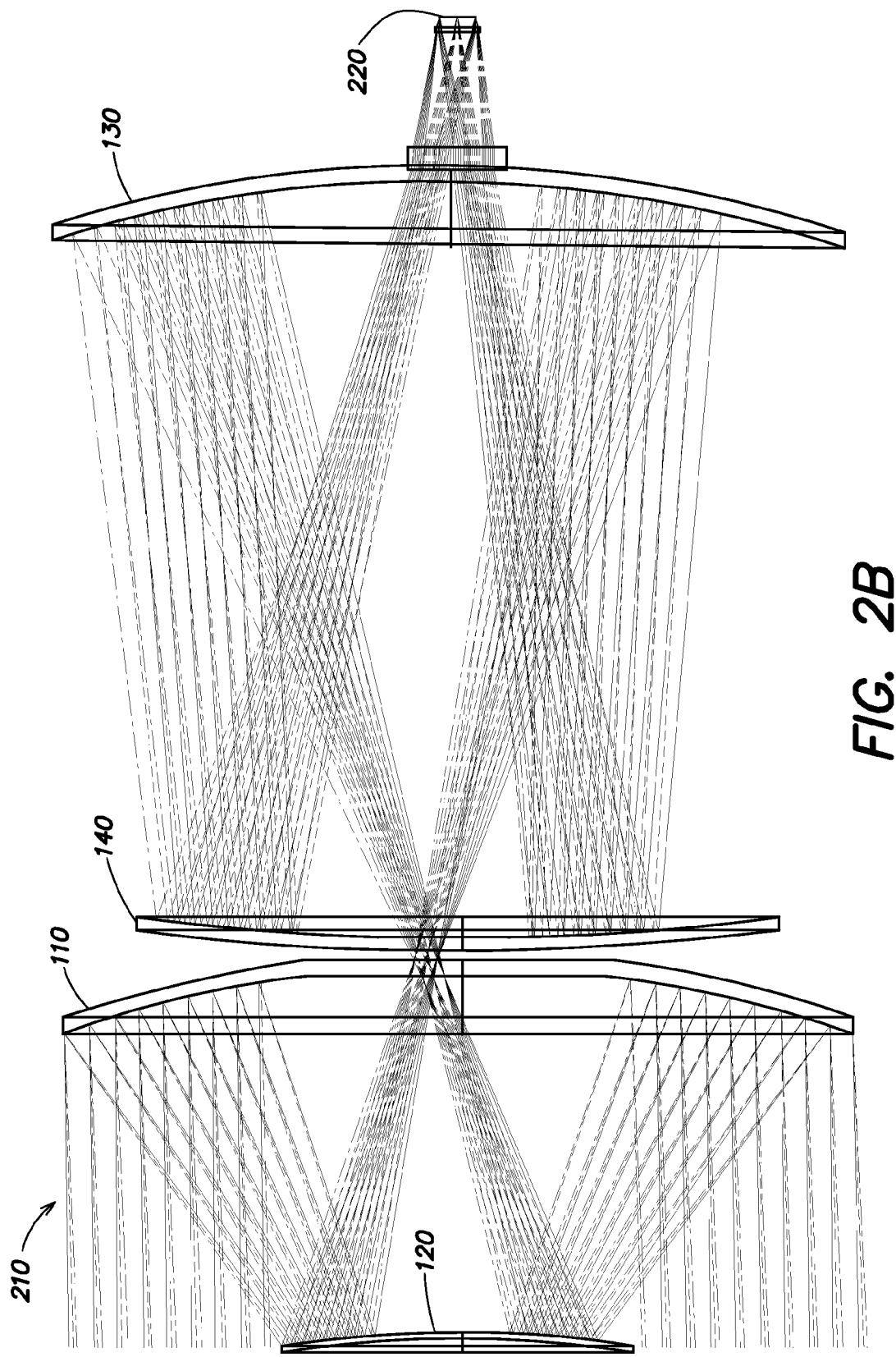
FIG. 2B is a ray trace of the example of the scanning telescope shown at the full scan position, according to aspects of the invention.
Figure 2C:
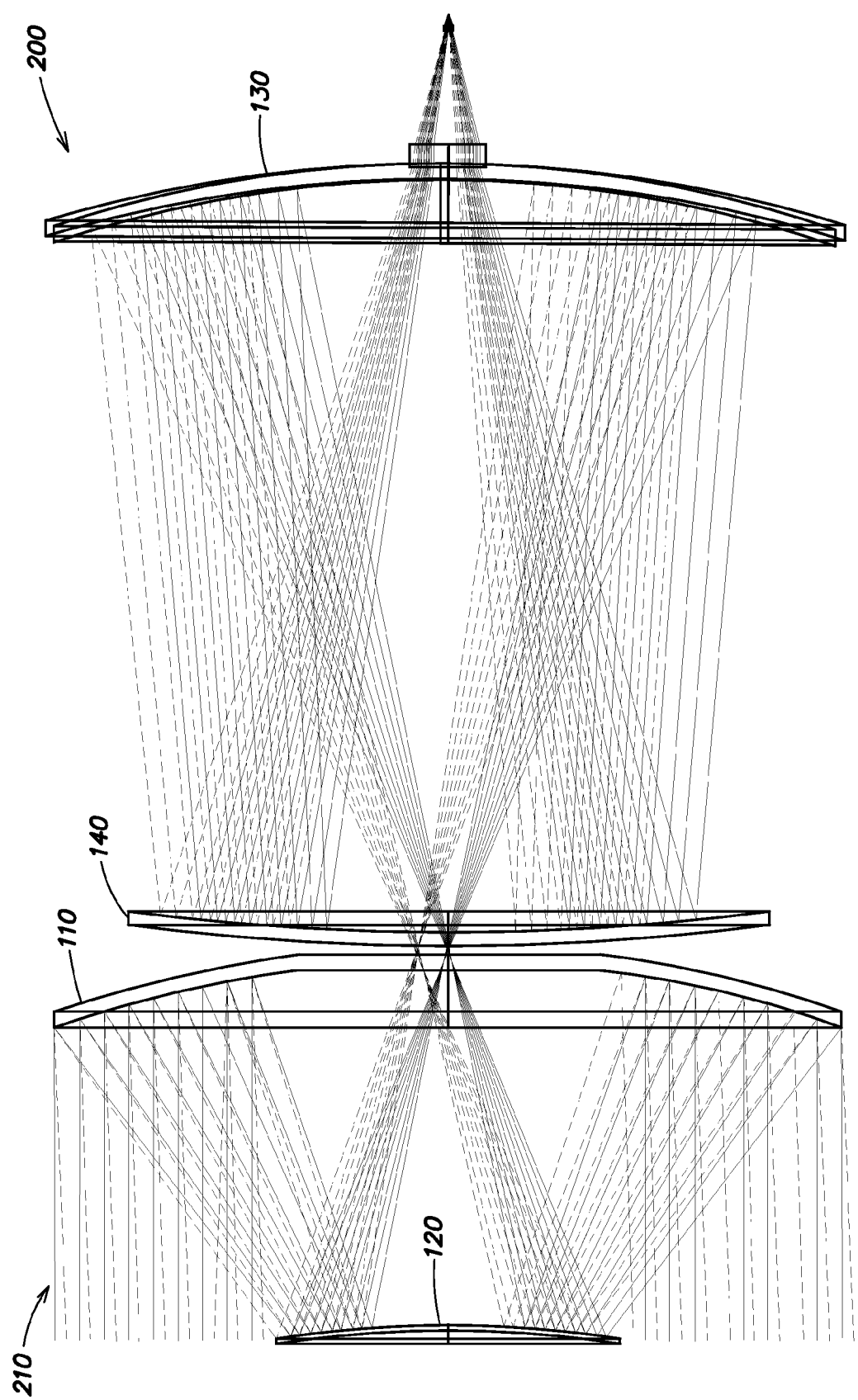
FIG. 2C is a ray trace showing the ray traces of FIGS. 2A and 2B superimposed and showing only the center of the field of view.

FIGS. 2A-C are ray traces for one example of a four mirror scanning telescope 200 including the primary mirror 110, secondary mirror 120, tertiary mirror 130, and quaternary mirror 140 of FIG. 1. FIG. 2A illustrates the ray trace with the tertiary mirror 130 positioned centered about the optical axis of the telescope, corresponding to the center (or "zero") position of the scan range. FIG. 2B illustrates the ray trace with the tertiary mirror 130 maximally tilted in one direction, corresponding to the maximum angular (or full") position of the scan range. FIG. 2C is a superposition of the ray traces of FIGS. 2A and 2B, showing only the rays corresponding to the center of the field of view. The varied relative positions of the tertiary mirror 130 in the center scan and full scan positions are visible in FIG. 2C.

Referring to FIGS. 1 and 2A-C, in one embodiment, the primary mirror 110 is a positive-optical-power mirror that receives electromagnetic radiation 210 from an external source scene (not shown). The electromagnetic radiation 210 may be of any operable wavelength, but in some examples is infrared light. The secondary mirror 120 is a negative-optical-power mirror that receives the electromagnetic radiation 210 reflected from the primary mirror 110. The tertiary mirror 130 is a positive-optical-power mirror that receives the electromagnetic radiation 210 reflected from the secondary mirror 120. The quaternary mirror 140 is a positive-optical-power mirror that receives the electromagnetic radiation 210 reflected from the tertiary mirror 130. The electromagnetic radiation 210 reflected from the quaternary mirror 140 is directed to the imaging detector 220, which as discussed above, is located at the image plane 150 of the telescope. In one example, the optical system comprising the primary mirror 110, the secondary mirror 120, the tertiary mirror 130, and the quaternary mirror 140, is such as to produce a high quality planar or near-planar (due to very small remaining aberrations) final image.

Referring again to FIG. 1, in one embodiment, the primary mirror 110, the secondary mirror 120, the tertiary mirror 130, and the quaternary mirror 140 are axisymmetric about the system optical axis 170. To permit this axial symmetry, the electromagnetic radiation 210 reflected from the secondary mirror 120 passes through a quaternary-mirror central opening 145 in the quaternary mirror 140, and through a primary-mirror central opening 115 in the primary mirror 110. After reflecting from the quaternary mirror 140, the electromagnetic radiation 210 passes through a tertiary-mirror central opening 135 in the tertiary mirror 130 to the imaging detector 220. The four-mirror telescope 200 provides the benefits of a wide field of view, a high quality image, and a compact configuration that optimally uses the space and volume available in a missile.

Table 1 below provides surface data for an optical prescription for an example of the scanning telescope 200 illustrated in FIGS. 1-2C. In this example, the telescope images a distant field of 0.55 inches in radius. The optical prescription for this example of the scanning telescope may be generated using an equation which is an industry standard and which would be known to those skilled in the art. It is to be appreciated however, that the prescription given in Table 1 is merely exemplary, and that the prescriptions of various embodiments of the scanning telescope 200 are determined by the intended imaging task to be performed by the optical system. The units in Table 1 are in inches.

TABLE 1

| Surface | Type | Radius | Thickness | Glass | Diameter | Conic |
|---|---|---|---|---|---|---|
| OBJ | Standard | Infinity | Infinity | | 0 | 0 |
| 1 | Standard | Infinity | 3.1 | | 6.324745 | 0 |
| Stop | Standard | −9.860464 | −2.954748 | Mirror | 6.274862 | −0.7909946 |
| 3 | QED-Type | −10.18061 | 9.050133 | Mirror | 2.697408 | 7.553188 |
| 4 | QED-Type | −10.0574 | −5.861124 | Mirror | 5.956466 | 0.2944567 |
| 5 | QED-Type | 17.12914 | 5.914129 | Mirror | 5.121621 | 8.816694 |
| 6 | Standard | −3.378935 | 0.1144472 | 2.421809, 0.00 | 0.6310174 | 0.8553958 |
| 7 | Standard | Infinity | 0.9276643 | | 0.6176462 | 0 |
| 8 | Standard | 1.014751 | 0.04220957 | 4.008659, 0.00 | 0.379108 | 1.570747 |
| 9 | Standard | 1.520748 | 0.1702805 | | 0.3665669 | 0 |
| Image | Standard | Infinity | | | 0.2519787 | 0 |

For the example given in Table 1, the entrance pupil (at the system aperture) has a diameter of 6.26523 inches, and the exit pupil has a diameter of 0.665952 inches. The effective focal length, both in air at the system temperature and pressure and in image space, is −13.19813 inches. The back focal length is 0.1674458 inches. The image space f/# is 2.106568, and the stop radius is 3.132614 inches. The primary wavelength in this example is 7 µm. The tertiary mirror pivot point is located 5.100389 inches behind the tertiary mirror. The secondary, tertiary and quaternary mirrors 120, 130, 140, respectively, are further described as "forbes polynomial" equations rotated around the optical axis in the same way that a parabolic mirror is a second order standard polynomial ($y=x^2$) rotated around the optical axis. Table 2 below provides the equation coefficients and information describing one example of the secondary, tertiary and quaternary mirrors 120, 130, 140, respectively, for the same prescription data provided in Table 1 above. Each of the surfaces is QED-Type, Type 1.

TABLE 2

| Surf. | Type | Type | # Terms | Norm Radius |
|---|---|---|---|---|
| 3 | ED-Type | 1 | 2 | 8.1812048E+02 |
| 4 | QED-Type | 1 | 8 | 2.4042826E+01 |
| 5 | QED-Type | 1 | 5 | 5.7921244E+01 |

| Surf. | a0 | a1 | a2 | a3 | a4 | a5 | a6 | a7 |
|---|---|---|---|---|---|---|---|---|
| 3 | −26479108E+12 | −5.2980816E+11 | — | — | — | — | — | — |
| 4 | −9.0089017E+01 | −2.5773361E+01 | 0.0000000 | −1.5144099E+01 | 1.7472209 | 9.1386386 | 1.1403570 | −8.3321291E−01 |
| 5 | −2.6859051E+04 | 0.0000000 | 9.3859472E+02 | 0.0000000 | 1.4058889E+02 | | | |

After being reflected from the quaternary mirror 140 and passing through the central opening 135 in the tertiary mirror, the electromagnetic radiation 210 is imaged on the detector 220 located at the image plane 150. In some examples, the detector 220 is an infrared detector. In one example, the infrared detector 220 is a focal plane array (FPA), on which an image of the received electromagnetic radiation 210 forms and is quantified with a series of sub-elements that define a pixel array. The telescope 200 directs the electromagnetic radiation 210 to be incident upon the detector 220, as shown in FIGS. 2A-C. The detector 220 may be housed in a housing, such as a cryogenic Dewar, for example, that may be used to cool the detector in certain applications. The detector 220 may include any type of well known detector assembly capable of producing an image from the incident electromagnetic radiation.

Figure 3A:
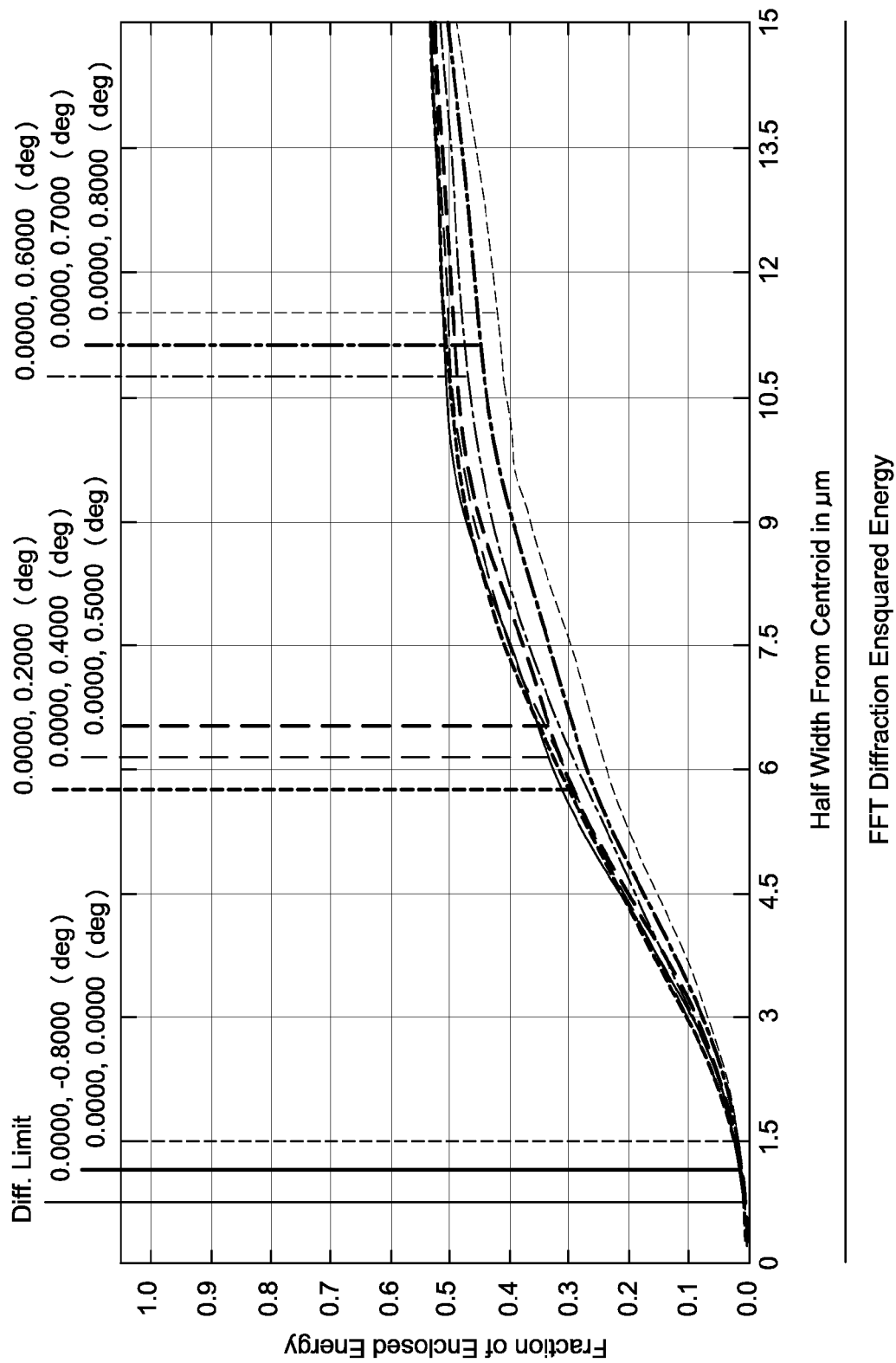
FIG. 3A is a graph illustrating, for the center (or zero) scan position, the fraction of enclosed energy as a function of the position of the ray on the detector for different target positions in the field of view.
Figure 3B:
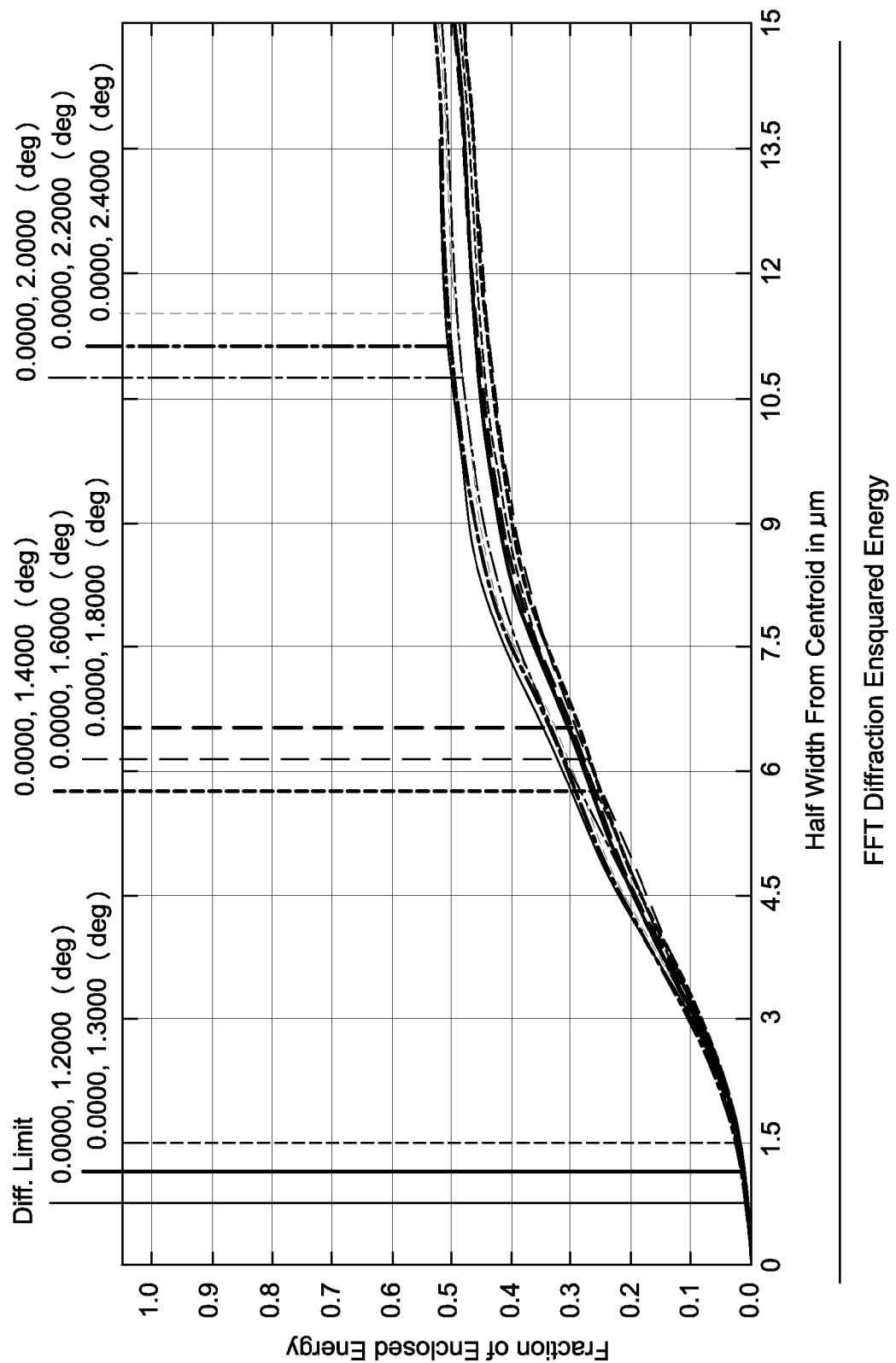
FIG. 3B is a graph illustrating, for the full scan position, the fraction of enclosed energy as a function of the position of the ray on the detector for different target positions in the field of view.

FIGS. 3A and 3B are graphs illustrating a measure of optical performance at the center (or zero) scan position and full scan position, respectively. Specifically, FIGS. 3A and 3B illustrate the "enclosed energy," or fraction of total light energy from a very distant target that falls on one detector element or pixel as a function of the distance (half width) from the centroid of the pixel. The trace labeled "Diff Limit" represents the diffraction limited performance which is the physical limit of the performance achievable by a perfect design. The remaining traces illustrate the results for targets at different positions in the field of view, with 0.0000, 0.0000 being the center of the field of view. Since a common pixel size is 30 micrometers (i.e., a half width from centroid of 15 μm corresponds to the outer edge of a 30 μm pixel), the results presented in FIGS. 3A and 3B demonstrate that the optical performance of the corresponding example of the telescope 200 is very good both at targets near the center of the field of view and at the edge of the field of view, and remains very similar when the movable mirror is scanned to its limit (FIG. 3B).

Thus, aspects and embodiments provide a scanning telescope configured with an on-axis optical design which may be optimized for installation in a missile, and which achieves scanning through motion of the rear-most (tertiary) mirror. In this manner, fast scanning over a range of angles may be achieved by moving only a relatively light element (the tertiary mirror), in contrast to conventional gimbaled systems in which the scan rate is relatively slow due to the need to move a large mass (generally the entire telescope and detector assembly), as discussed above. In addition to fast scanning, embodiments of the telescope discussed herein achieve good optical performance, as demonstrated in FIGS. 2A-C and 3A-B.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A scanning telescope configured for installation in a missile and comprising:
   a primary mirror configured to receive electromagnetic radiation via a system aperture located proximate a nose of the missile and to reflect the electromagnetic radiation;
   a secondary mirror optically coupled to the primary mirror and configured to receive and further reflect the electromagnetic radiation reflected from the primary mirror;
   a tertiary mirror optically coupled to the secondary mirror and configured to receive and further reflect the electromagnetic radiation reflected from the secondary mirror, the tertiary mirror further configured to be movable over a range of angular tilt relative to an optical axis of the scanning telescope to scan a field of view of the scanning telescope over a scan range; and
   a quaternary mirror optically coupled to the tertiary mirror and configured to receive the electromagnetic radiation reflected from the tertiary mirror and to reflect and focus the electromagnetic radiation onto a focal plane of the scanning telescope;
   wherein the primary, secondary, tertiary, and quaternary mirrors are axisymmetric about the optical axis, a size and shape of the primary, secondary, tertiary, and quaternary mirrors being selected to configure the scanning telescope for installation in the missile; and
   wherein the primary, secondary, tertiary, and quaternary mirrors are fabricated from a same material, the material being selected from a group consisting of single crystal silicon, silicon carbide, aluminum, and Beryllium.

2. The scanning telescope of claim 1, wherein the primary mirror includes a primary-mirror central opening through which the electromagnetic radiation reflected from the secondary mirror passes.

3. The scanning telescope of claim 2, wherein the quaternary mirror includes a quaternary-mirror central opening through which the electromagnetic radiation reflected from the secondary mirror passes.

4. The scanning telescope of claim 1, wherein the electromagnetic radiation includes infrared radiation.

5. A method of optical imaging in a missile-mounted optical system comprising:
   receiving electromagnetic radiation through an optical aperture positioned proximate a nose of the missile;
   directing and focusing the electromagnetic radiation onto an imaging detector with an on-axis four-mirror reflective telescope; and scanning a field of view of the imaging detector over an angular scan range by tilting a rear-most mirror of the four-mirror reflective telescope about an optical axis of the four-mirror reflective telescope.

6. The method of claim 5, wherein directing and focusing the electromagnetic radiation includes:
reflecting the electromagnetic radiation received through the optical aperture with a primary mirror;
reflecting the electromagnetic radiation reflected by the primary mirror with a secondary mirror;
reflecting the electromagnetic radiation reflected by the secondary mirror with a tertiary mirror, the tertiary mirror being the rear-most mirror; and
reflecting and directing to the imaging detector the electromagnetic radiation reflected by the tertiary mirror with a quaternary mirror.

7. The method of claim 6, wherein reflecting the electromagnetic radiation from the secondary mirror includes directing the electromagnetic radiation though a primary-mirror central opening in the primary mirror and through a quaternary-mirror central opening in the quaternary mirror to the tertiary mirror.

8. The method of claim 5, wherein receiving the electromagnetic radiation includes receiving infrared radiation.

9. A scanning telescope imaging system configured to be mounted in a missile comprising:
an imaging detector; and
an on-axis four-mirror reflective telescope configured to receive electromagnetic radiation through an optical aperture positioned proximate a nose of the missile, and to direct and focus the electromagnetic radiation onto the imaging detector, the on-axis four-mirror reflective telescope including a rear-most mirror configured to be movable over a range of angular tilt relative to an optical axis of the scanning telescope to scan a field of view of the imaging detector over a scan range.

10. The scanning telescope imaging system of claim 9, wherein the on-axis four-mirror reflective telescope includes:
a primary mirror configured to receive the electromagnetic radiation via the optical aperture and to reflect the electromagnetic radiation;
a secondary mirror optically coupled to the primary mirror and configured to receive and further reflect the electromagnetic radiation reflected from the primary mirror;
a tertiary mirror optically coupled to the secondary mirror and configured to receive and further reflect the electromagnetic radiation reflected from the secondary mirror, the tertiary mirror being the rear-most mirror and configured to scan the field of view of the imaging detector over the scan range; and
a quaternary mirror optically coupled to the tertiary mirror and configured to receive the electromagnetic radiation reflected from the tertiary mirror and to reflect and focus the electromagnetic radiation onto a focal plane of the scanning telescope;
wherein the primary, secondary, tertiary, and quaternary mirrors are axisymmetric about the optical axis.

11. The scanning telescope imaging system of claim 10, wherein the primary mirror includes a primary-mirror central opening through which the electromagnetic radiation reflected from the secondary mirror passes, and the quaternary mirror includes a quaternary-mirror central opening through which the electromagnetic radiation reflected from the secondary mirror passes.

12. The scanning telescope imaging system of claim 10, the primary, secondary, tertiary, and quaternary mirrors are fabricated from one of single crystal silicon, silicon carbide, and aluminum.

13. The scanning telescope imaging system of claim 10, the primary, secondary, tertiary, and quaternary mirrors are fabricated from Beryllium.

14. The scanning telescope imaging system of claim 9, wherein the electromagnetic radiation includes infrared radiation.

15. The scanning telescope imaging system of claim 14, wherein the field of view is approximately 1.1° in diameter and the range of angular tilt is approximately ±1.75° relative to the optical axis.

16. The scanning telescope of claim 1, wherein the field of view is approximately 1.1° in diameter and the range of angular tilt is approximately ±1.75° relative to the optical axis.

17. The method of claim 5, wherein scanning the field of view of the imaging detector includes tilting the rear-most mirror of the four-mirror reflective telescope approximately ±1.75° about the optical axis.

* * * * *